(12) United States Patent
Hughes

(10) Patent No.: US 11,464,152 B2
(45) Date of Patent: Oct. 11, 2022

(54) COMBINATION DIGGING DEVICE AND HEAD REST

(71) Applicant: Derek Hughes, Coalville, UT (US)

(72) Inventor: Derek Hughes, Coalville, UT (US)

(73) Assignee: Sand Lounger LLC, Salt Lake City, UT (US)

( * ) Notice: Subject to any disclaimer, the term of this patent is extended or adjusted under 35 U.S.C. 154(b) by 465 days.

(21) Appl. No.: 16/684,704

(22) Filed: Nov. 15, 2019

(65) Prior Publication Data

US 2021/0015019 A1 Jan. 21, 2021

Related U.S. Application Data

(60) Provisional application No. 62/876,119, filed on Jul. 19, 2019.

(51) Int. Cl.
*A01B 1/02* (2006.01)
*A47G 9/10* (2006.01)

(52) U.S. Cl.
CPC ............ *A01B 1/022* (2013.01); *A47G 9/1045* (2013.01); *A47G 9/1081* (2013.01)

(58) Field of Classification Search
CPC .. A01B 1/022; A01B 1/20; A01B 1/22; A47G 9/1045; A47G 9/1081
USPC ............................................. 294/51; 172/375
See application file for complete search history.

(56) References Cited

U.S. PATENT DOCUMENTS

| | | | |
|---|---|---|---|
| 407,776 A | 7/1889 | Harrison | |
| 1,344,256 A | * | 6/1920 | Blackman ............... A01B 1/222 294/51 |
| 1,478,204 A | * | 12/1923 | Cooney et al. ........ A01B 1/225 294/51 |
| 2,120,310 A | | 6/1938 | Duncan |
| 2,663,029 A | | 12/1953 | Whitley et al. |
| 3,007,735 A | | 11/1961 | Cohn |

(Continued)

FOREIGN PATENT DOCUMENTS

| | | |
|---|---|---|
| CN | 207612534 U | 7/2018 |
| CN | 207820571 U | 9/2018 |

OTHER PUBLICATIONS

Ebay Seller: Tribal and Ethnic Art.; "Maresha Old traditional Eithiopia digging stick or hoe of the Harar Region 15." Retrieved from https://www.ebay.com/itm/361542711517.

(Continued)

*Primary Examiner* — Dean J Kramer
(74) *Attorney, Agent, or Firm* — Thorpe North & Western, LLP; Jed H. Hansen

(57) ABSTRACT

A combination digging tool and head rest is disclosed having a planar elongate linear member having a first end and a second end, and a planar non-linear member. The linear and non-linear members are coupleable to one another at different locations to form first and second orientations. The first orientation is formed when the first end of the planar elongate linear member is coupled to the first end of the non-linear member so that the planar elongate linear member and the planar elongate non-linear member are coplanar and form a generally J-shaped figure. That figure can be used as a digging tool. The second orientation is formed when the first end of the planar elongate linear member is coupled to the side portion of the non-linear member to form a head rest.

19 Claims, 7 Drawing Sheets

(56) References Cited

U.S. PATENT DOCUMENTS

| | | | |
|---|---|---|---|
| D199,373 S | 10/1964 | Alissandratos | |
| D200,935 S | 4/1965 | Alissandratos | |
| 4,063,318 A | 12/1977 | Nicholson | |
| 4,498,704 A | 2/1985 | Hildreth | |
| 4,527,833 A * | 7/1985 | Parker | A47C 7/383 |
| | | | 297/397 |
| 4,544,203 A | 10/1985 | Younger et al. | |
| D287,083 S | 12/1986 | Macedonio | |
| 4,865,372 A | 9/1989 | Gabriel | |
| D305,494 S | 1/1990 | Jasperson | |
| 4,914,765 A | 4/1990 | Smith | |
| D312,933 S | 12/1990 | Lloyd | |
| 5,165,137 A | 11/1992 | Amrein et al. | |
| 5,551,110 A | 9/1996 | Armstrong et al. | |
| 5,791,708 A | 8/1998 | Capriotti | |
| 6,044,914 A | 4/2000 | Johnson | |
| D434,638 S | 12/2000 | McLauchlan | |
| 6,594,839 B1 | 7/2003 | Papay | |
| D518,691 S | 4/2006 | Benson | |
| D536,225 S | 2/2007 | Zinger | |
| D539,573 S | 4/2007 | Nguyen | |
| 7,303,237 B1 * | 12/2007 | Hughes | B60N 2/882 |
| | | | 5/636 |
| 7,347,468 B1 * | 3/2008 | Tidcomb | E01H 5/02 |
| | | | 294/51 |
| 7,406,975 B1 * | 8/2008 | Carrier, Jr. | E04H 12/2261 |
| | | | 294/51 |
| 7,658,422 B2 | 2/2010 | Carr | |
| D614,423 S | 4/2010 | Mohazzabi | |
| D615,387 S | 5/2010 | Prichard | |
| D617,175 S | 6/2010 | Anderson et al. | |
| 8,769,744 B1 | 7/2014 | Brown | |
| D728,817 S | 5/2015 | Markewitz | |
| D803,610 S | 11/2017 | Jackow | |
| D810,528 S | 2/2018 | Baker | |
| D856,056 S | 8/2019 | Knecht | |
| D872,562 S | 1/2020 | He | |
| D901,263 S | 11/2020 | Citron | |
| 2002/0050009 A1 | 5/2002 | Ley | |
| 2004/0188110 A1 | 9/2004 | Liao | |
| 2005/0109346 A1 | 5/2005 | Cohen | |
| 2005/0160532 A1 | 7/2005 | Froelich | |
| 2009/0084564 A1 | 4/2009 | Buck et al. | |
| 2013/0232696 A1 | 9/2013 | Halimi et al. | |
| 2015/0208800 A1 | 7/2015 | Yang | |
| 2016/0242351 A1 | 8/2016 | Richmond | |
| 2016/0331126 A1 | 11/2016 | Mills | |
| 2017/0071349 A1 | 3/2017 | Wong | |
| 2019/0239668 A1 | 8/2019 | Sabulao | |

OTHER PUBLICATIONS

Oregon History Project.; "Plateau Culture Digging Stick." Retrieved from: https://oregonhistoryproject.org/articles/historical-records/plateau-culture-digging-stick/#.XupykmhKjIW; 3 pages.

Tools From the Earth.; "Gathering, Farming, and Digging." Retrieved from: https://toolsfromtheearth.com/category/gathering/ ; 8 Pages.

Family Struggling—SandLounger, Video post date Jul. 14, 2021, Video retrieval date Oct. 18, 2021, https://www.youtube.com/watch?v=7WLulw_Ylu8.

* cited by examiner

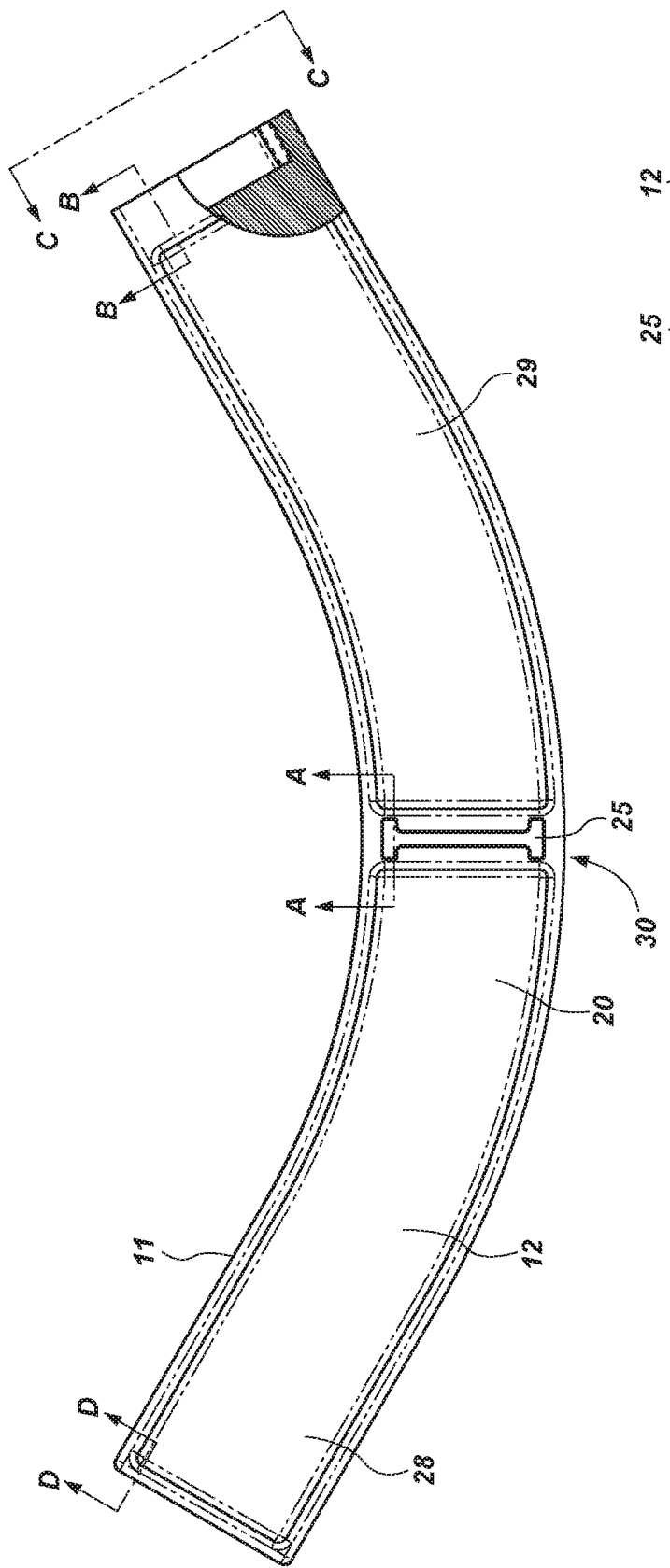
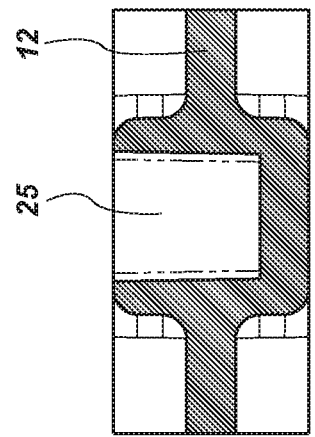
FIG. 4
FIG. 5

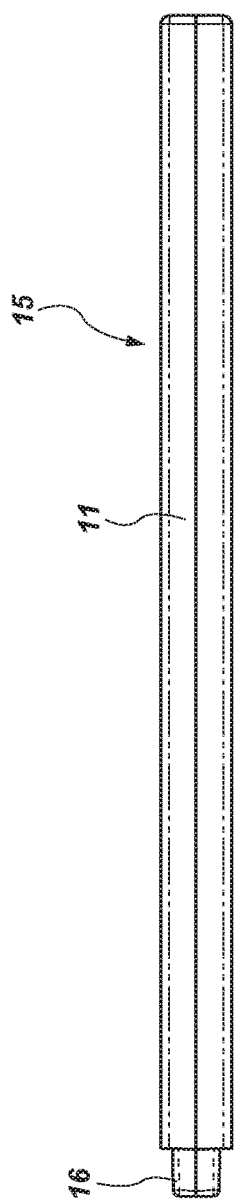
FIG. 10
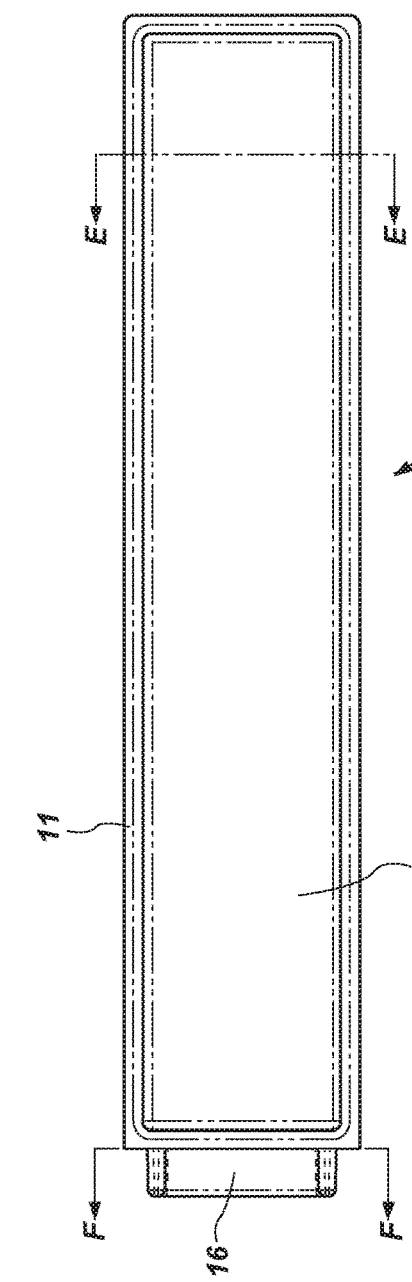
FIG. 11
FIG. 12
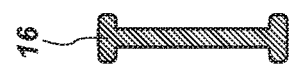
FIG. 13

COMBINATION DIGGING DEVICE AND HEAD REST

PRIORITY CLAIM

The present application claims priority to U.S. Ser. No. 62/876,119 filed on Jul. 19, 2019 entitled "Combination Digging Device and Head Rest" which is incorporated herein by reference in its entirety.

FIELD OF THE DISCLOSURE

The technology relates generally to methods, systems, and devices for creating an area to rest in soil, snow, or other media.

BRIEF DESCRIPTION OF THE DRAWINGS

It will be readily appreciated that the components of the technology, as generally described and illustrated in the figures herein, could be arranged and designed in a wide variety of different configurations. Nonetheless, the technology will be described and explained with additional specificity and detail through the use of the accompanying drawings in which:

FIG. 4 is a side view of a portion of a digging device in accordance with on aspect of the technology;

FIG. 5 is a cross section of the device shown in FIG. 4 in accordance with one aspect of the technology taken at section A-A;

FIG. 10 is a top side view of a portion of a digging device in accordance with one aspect of the technology;

FIG. 11 is a top side view of a portion of a digging device in accordance with one aspect of the technology;

FIG. 12 is a cross sectional view of a portion of a digging device in accordance with one aspect of the technology taken at section E-E;

FIG. 13 is a cross section of a portion of a digging device in accordance with one aspect of the technology taken at section F-F.

DESCRIPTION OF ASPECTS OF THE TECHNOLOGY

Figure 1:
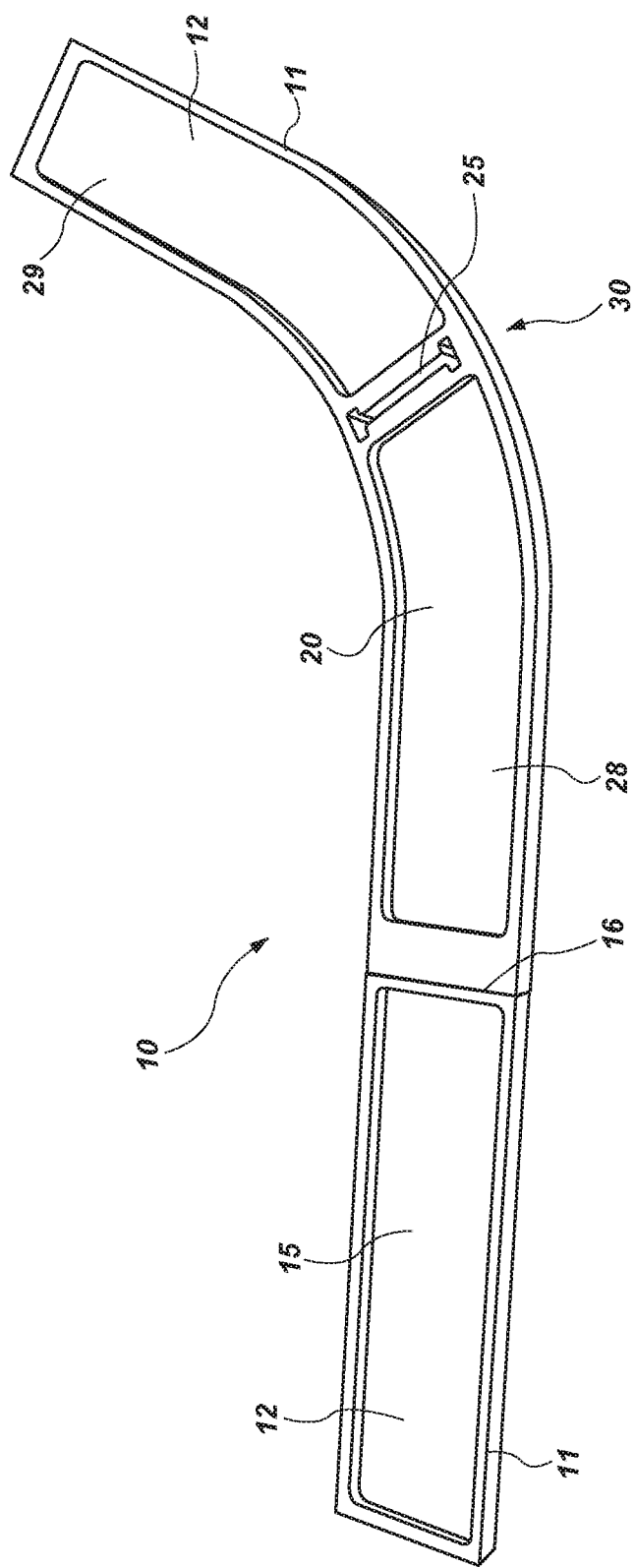
FIG. 1 is a perspective image of a digging device and head rest in a first configuration in accordance with one aspect of the technology.
Figure 2:
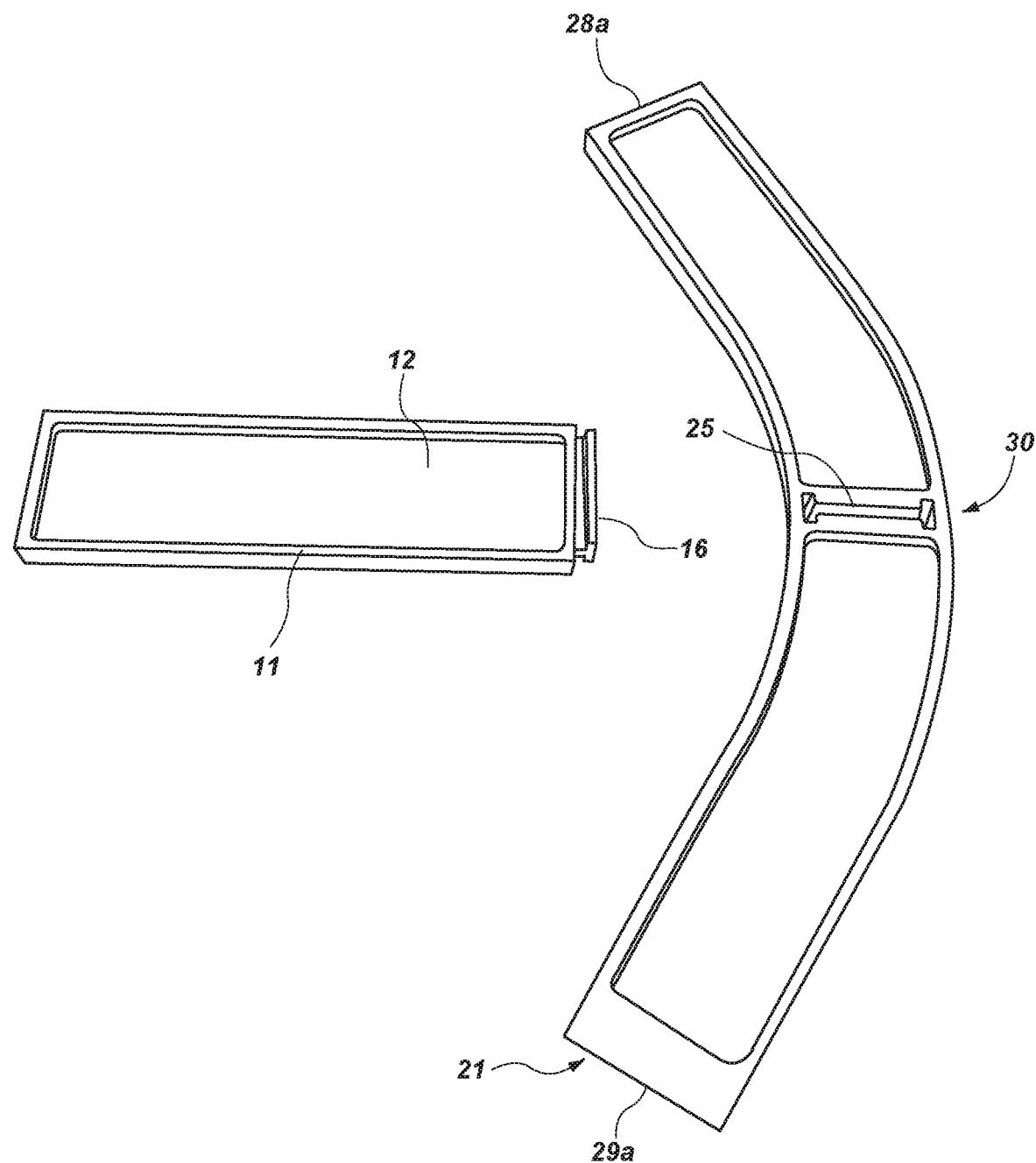
FIG. 2 is a perspective image of a digging device and head rest in a second configuration in accordance with one aspect of the technology.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a line" includes a plurality of such lines.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," in this specification it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.8, 3, 3.1, 4, 4.6, and 5, individually.

This same principle applies to ranges reciting only one numerical value as a minimum or a maximum. Furthermore, such an interpretation should apply regardless of the breadth of the range or the characteristics being described.

As used herein, "enhanced," "improved," "performance-enhanced," "upgraded," "improvement," and the like, when used in connection with the description of a device, component, or process, refers to a characteristic of the device, component or process that provides measurably better form, function, or outcome as compared to previously known devices or processes. This applies both to the form and function of individual components in a device or process, as well as to such devices or processes as a whole.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

EXAMPLE EMBODIMENTS

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter. Aspects of the technology generally reside in a multi component apparatus having a substantially planar, elongate member with a linear proximal end and a non-linear distal end, wherein the linear proximal end is detachable from the non-linear distal end and is attachable to a lateral side of the non-linear distal end at an angle that is not parallel to the non-linear distal end. Generally speaking, when the linear proximal end is coupled to the non-linear distal end in its parallel configuration, the device can be used as a digging tool to carve or otherwise form a cavity in soil, snow, or other media to accommodate a portion of the backside of a human occupant, similar to a chair or other support. When the linear proximal end is detached and reattached at its non-parallel angle to the lateral side of the non-linear distal end, it forms a head rest. When the head rest is placed on a back, top portion of the cavity, a person can sit in the cavity and rest his/her head on the head rest.

With reference to FIGS. 1-14, in one aspect of the technology, the device 10 is generally shaped to approximate a J, though it may approximate other shapes as suits a particular application. The device 10 includes a first planar elongate linear section 15 that is detachably coupled to a planar non-linear section 20 at joint or connector 16. In one aspect of the technology, the planar elongate section 15 is couplable to the non-linear section 20 by an I-shaped tab 16 disposed on one end of the linear section 15 that is insertable into a slot 21 disposed on one end of the non-linear section 20. In one aspect of the technology, a slot 21 is disposed on both ends of the non-linear section 20 so that the linear section 15 is couplable to either side of non-linear section 20. In one aspect of the technology, a slot 25 is disposed on a lateral side of the non-linear section 20 that is shaped to receive the I-shaped tab 16. The channel 25 is configured so that when the linear section 15 is disposed in channel 25, the linear section 15 serves to prop the non-linear section 20 up on its ends 23 and 24.

Figure 3:
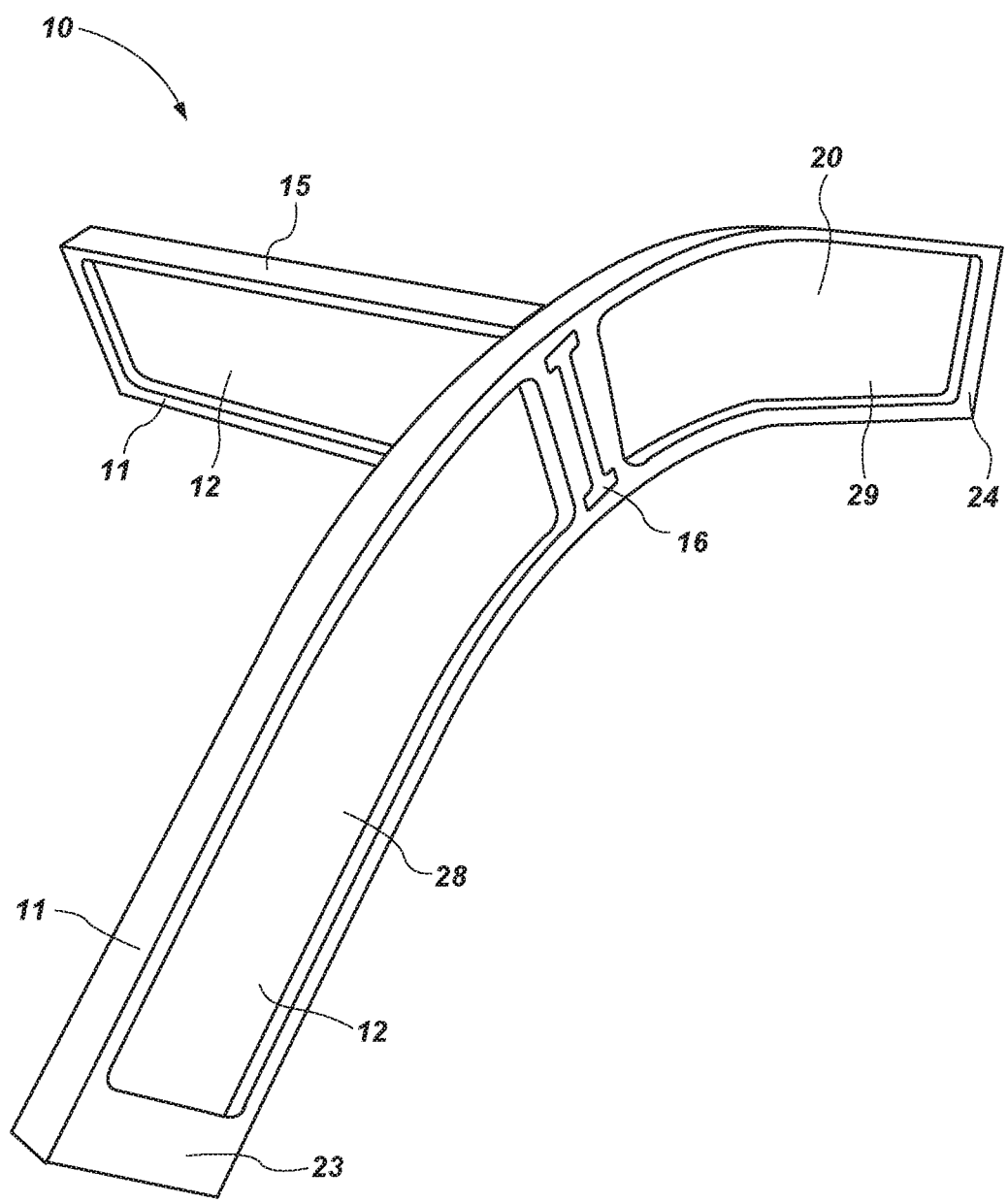
FIG. 3 is a perspective image of a digging device and head rest in a third configuration in accordance with one aspect of the technology.
Figure 6:
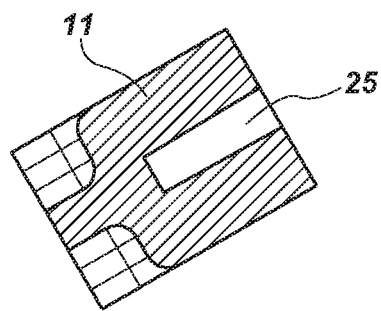
FIG. 6 is a cross section of the device shown in FIG. 4 in accordance with one aspect of the technology taken at section B-B.
Figure 7:
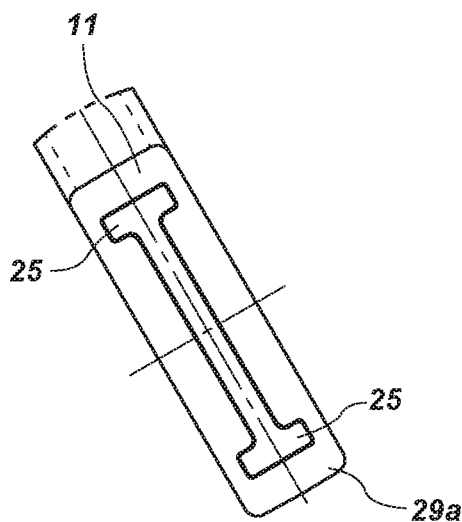
FIG. 7 is a cross section of the device shown in FIG. 4 in accordance with one aspect of the technology taken at section C-C.
Figure 8:
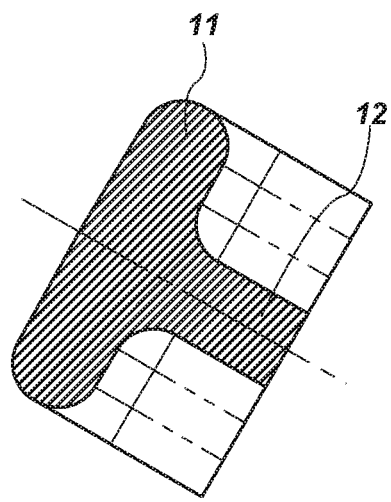
FIG. 8 is a cross section of the device shown in FIG. 4 in accordance with one aspect of the technology taken at section D-D.
Figure 9:
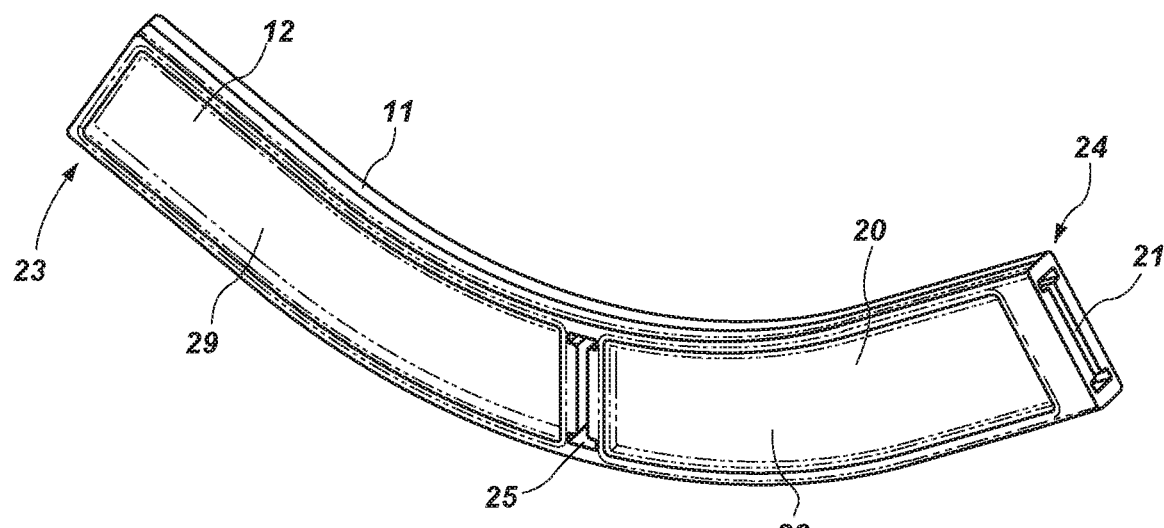
FIG. 9. is a perspective view of a portion of a digging device in accordance with one aspect of the technology.
Figure 14:
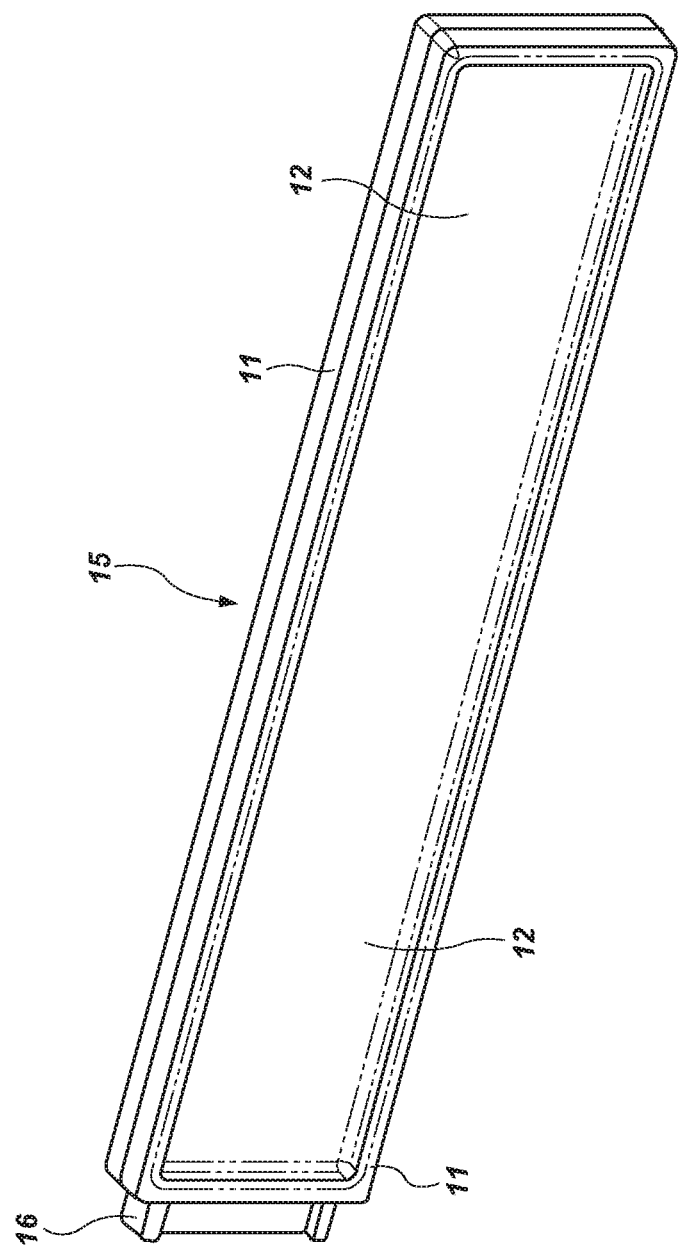
FIG. 14 is a perspective view of a portion of a digging device in accordance with one aspect of the technology.

When the device 10 is in a first configuration, as shown in FIG. 1 it can be used as a digging tool. Because of its extended end combined with its non-linear digging end, the device 10 is uniquely capable of carving a cavity that will approximate the backside and a portion of the back of a human occupant. When it is in a second configuration, it is in an uncoupled state (shown in FIG. 2). In a third configuration (as shown in FIG. 3), the device 10 acts as a head rest and can be placed at the top of the cavity. In one aspect of the technology, a user may wrap a towel or other cushioning material around the non-linear section 20 when it is in its head-rest configuration to cushion the head of the user. While aspects of the technology include a simple plastic construction, it is understood that that the non-linear section 20 may also include an integrated or removable padded component that is disposed opposite the slot 25 to cushion the head of the user.

While a tab and slot arrangement are disclosed, it is understood that any coupling mechanism could be used in connection with the disclosed device to couple the different sections together. For example, the different sections could snap together with different hook and loop configurations, etc. In another aspect of the technology, a tab and channel configuration may be employed so that the different portions of the device are slidably engageable. Clips, threaded fasteners, and other means of coupling or fastening ends together in a removable arrangement may all be used without departing from the scope of the technology.

While the slot 25 is configured such that when the I-shaped tab 16 is disposed therein the linear section 15 is disposed perpendicular or normal to the side of the non-linear section 20, it is understood that in other aspects therein the linear section 15 may reside at a different non-parallel angle to the non-linear section so long as the linear section 15 is capable of supporting the non-linear section 20 in an upright position. Moreover, while a single linear section 15 is disclosed, it is understood that the linear section 15 may comprise multiple sections that could couple to multiple channels disposed on the side of the non-linear section to form multiple support arms extending from a lateral side of the non-linear section 20.

In one aspect of the technology, the non-linear section 20 comprises a curvilinear section having a radius of curvature ranging from approximately 115 to 125 degrees. However, it is understood that the device 10 may have a radius of curvature that is greater or less than 115 to 125 degrees in different aspects of the technology as suits a particular application. Moreover, the non-linear section 20 need not be curvilinear. Rather, in one aspect of the technology, the non-linear section 20 may form an angle (e.g., ranging from 45 to 115 degrees) to provide for a more pointed digging apparatus. For example, portions 28 and 29 may have a mid-section and slot 25 that are defined by a sharp 45 degree angle rather than a curved surface. Moreover, while the non-linear section 20 is disclosed as being a single integrated component, it is understood that the non-linear section 20 may also comprise multiple pieces that can be coupled together in order to collapse the entire device into a smaller, more portable, system.

In one aspect of the technology the non-linear section 20 is substantially symmetrical about an axis collinear with slot 25. Meaning the portion 28 and 29 are similarly shaped and have a similar length (e.g., 1 to 10 inches) extending away from slot 25. However, in another aspect of the technology, portions 28 and 29 have different lengths and/or different shapes. In one aspect, portion 28 is longer than portion 29. In this manner, where both portions have a slot that resides on their distal ends (28a, 29a) that can accept the I-shaped tab 16, the device 10 can be modified so that the general shape of the device 10 when in the first configuration (or the digging configuration) is different depending on which end (28a or 29a) of the non-linear section 20 includes the linear section 15. In one aspect of the technology, the linear section 15 has a length similar to the different portions (28, 29) of the non-linear section 20. In another aspect of the technology, the different portions (28, 29) may have a similar length, but the slot 25 (or in some aspects a channel, clip, etc.) is located on one portion or the other, rather than being disposed in the middle of the two portions.

In one aspect of the technology, the linear section 15 is longer (e.g., 1 to 15 inches) than the different portions (28, 29) of the non-linear section. Moreover, in one aspect of the technology, the width of the linear section 15 and the width of the non-linear section 20 is substantially the same and ranges, for example, from 1 to 4 inches. The device 10 may comprise a thermoplastic, in one aspect, though it may be made from any number of different materials (e.g., plastic, wood, metal, rubber, polymers, etc.) or a combination of different materials as suits a particular design. Moreover, the device 10 may be constructed such that the outer edges 11 of the device 10 are thicker than the internal portions 12 of the device. In this manner, the digging edge and/or edges that will be subjected to greater force are more robust. For example, in one aspect of the technology, the edges 11 range from approximately ½ to 1 and ½ inches thick. The internal portion 12 ranges from approximately ⅛ inch to about ½ inch. In another aspect of the technology, the "digging edge" 30 of the device 10, or the area that may be used to form the void in the sand may have a different edge than the other edges of the device 10. For example, the digging edge 30 may have a saw tooth shape, a crenelated shape, or other shapes to help break up a ground surface (e.g., soil, snow, etc.) that may be dense or difficult to dig.

In one aspect of the technology, when the device 10 is in the second configuration (the uncoupled configuration) a side of the linear section 15 may be coupled or connected to a side of the non-linear section 20 so that the planar sides of the respective sections are in contact with one another. In this configuration, the device 10 is in a collapsed state so that it is easier to transport. The linear section 15 may coupled to the non-linear section 20 with a band, strap, or other fastener. In one aspect, the linear section 15 may also be clipped or otherwise snapped to the non-linear section in the collapsed state. In another aspect of the technology, device 10 comprises a non-linear section 20 with a linear section 15 that is pivotably attached to the non-linear section. Meaning, the device 10 has a configuration similar to that shown in FIG. 3 in an "extended" position where it functions as a headrest and a configuration wherein the linear section 15 is collapsed next to and adjacent a side of the non-linear section 20. In a collapsed configuration, the non-linear section 20 is used as the digging tool and the linear section is used simply as a stand to position the device 10 as a headrest. In this aspect, the linear section 15 may be replaced with any device capable of functioning as a stand that is pivotably connected to the section 20. In this aspect, the stand may be linear or non-linear and may take many different shapes (e.g., rectangular, oval, etc.).

The foregoing detailed description describes the technology with reference to specific exemplary embodiments. However, it will be appreciated that various modifications and changes can be made without departing from the scope of the present disclosure as set forth in the appended claims. The detailed description and accompanying drawings are to be regarded as merely illustrative, rather than as restrictive, and all such modifications or changes, if any, are intended to fall within the scope of the present disclosure as described and set forth herein.

More specifically, while illustrative exemplary invention embodiments have been described herein, the disclosure is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in any claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the disclosure should be determined solely by the appended claims and their legal equivalents, rather than by the descriptions and examples given above.

The invention claimed is:

1. An apparatus, comprising:
a substantially planar, elongate member having a linear proximal member with a first end and a second end, and a planar non-linear distal member with a first end and a second end;
wherein the linear proximal member has a width and a height and the non-linear distal member has a width and a height;
wherein the first end of the linear proximal member is removably attached to the first end of the planar non-linear distal member, the linear proximal member and the non-linear distal member being co-planar;
wherein the linear proximal member is removably attachable to a lateral side of the non-linear distal member at an angle that is not parallel to the non-linear distal member; and
wherein the width and the height of the non-linear member is equivalent to the width and the height of the linear member.

2. The apparatus of claim 1, wherein the first end of the linear proximal member is substantially rectangular.

3. The apparatus of claim 1, wherein the first end of the non-linear distal member is substantially rectangular.

4. The apparatus of claim 1, wherein the second end of the non-linear member is substantially rectangular.

5. The apparatus of claim 1, wherein the non-linear distal member comprises a connector located on a medial portion of a lateral side of said non-linear distal member, said connector configured to receive a complementary connector disposed about the first or second end of the linear proximal member.

6. The apparatus of claim 1, wherein the non-linear distal member comprises a radius of curvature ranging from 115 to 125 degrees.

7. The apparatus of claim 1, wherein the substantially planar, elongate member comprises a plastic, a rubber, a metal, a wood, or a combination of two or more of plastic, rubber, metal, or wood.

8. A multi-use digging tool and rest, comprising:
a planar elongate linear member having a first end and a second end, and a planar non-linear member having a first end, a second end, and a medial portion, the linear and non-linear members coupleable to one another at different locations to form first and second orientations;
wherein the first orientation comprises the first end of the planar elongate linear member coupled to the first end of the non-linear member so that the planar elongate linear member and the planar elongate non-linear member are coplanar and form a generally J-shaped figure; and
wherein the second orientation comprises the first end of the planar elongate linear member coupled to the medial portion of the non-linear member.

9. The tool of claim 8, wherein the first end of the elongate linear member comprises a male connector configured to couple with a female connector disposed about the first end of the non-linear member.

10. The tool of claim 8, wherein the first end of the elongate linear member comprises a female connector configured to couple with a male connector disposed about the first end of the non-linear member.

11. The tool of claim 8, wherein the first end of the elongate linear member comprises a male connector configured to couple with a female connector disposed about the medial portion of the non-linear member.

12. The tool of claim 8, wherein the first end of the elongate linear member comprises a female connector configured to couple with a male connector disposed about the medial portion of the non-linear member.

13. A method of creating a rest, comprising:
obtaining a multi-use tool comprising a planar elongate linear member having a first end and a second end, and a planar non-linear member having a first end, a second end, and a lateral side portion, the linear and non-linear members coupleable to one another at different locations to form first and second orientations;
positioning the multi-use tool in a first position wherein a first end of the planar elongate linear member is coupled to a first end of the planar non-linear member in a coplanar relationship to form a J-shaped device;
using the device to create a void in a substrate;
positioning the multi-use tool in a second position, wherein the planar elongate linear member is coupled to the lateral side portion of the non-linear member; and
placing the multi-use tool while in the second position atop an edge of the void created in the substrate by the multi-use tool.

14. The method of claim 13, wherein the J-shaped device comprises a curvilinear end.

15. The method of claim 13, wherein the J-shaped device comprises a rectilinear end.

16. The method of claim 13, further comprising removably placing a pad about a face of the non-linear member when the tool is positioned in the second position.

17. The method of claim 13, wherein the J-shaped device is greater than 1 foot in length.

18. The method of claim 13, wherein the J-shaped device is less than 4 feet in length.

19. The method of claim 13, wherein when the multi-use tool is in the second position and is disposed atop an edge of the void, portions of the first and second end of the non-linear member and portions of the second end of the linear member are in contact with the substrate.

\* \* \* \* \*